July 22, 1958  E. H. HIGHAM ET AL  2,844,350
LIQUID WEIGHING AND DISPENSING DEVICE
Filed Jan. 24, 1952  3 Sheets-Sheet 1

INVENTORS EDWARD HALL HIGHAM
& HORACE AUGUSTUS THOMAS by
Campbell, Brumbaugh, Free & Graves July 22, 1958  E. H. HIGHAM ET AL  2,844,350
LIQUID WEIGHING AND DISPENSING DEVICE
Filed Jan. 24, 1952  3 Sheets-Sheet 2
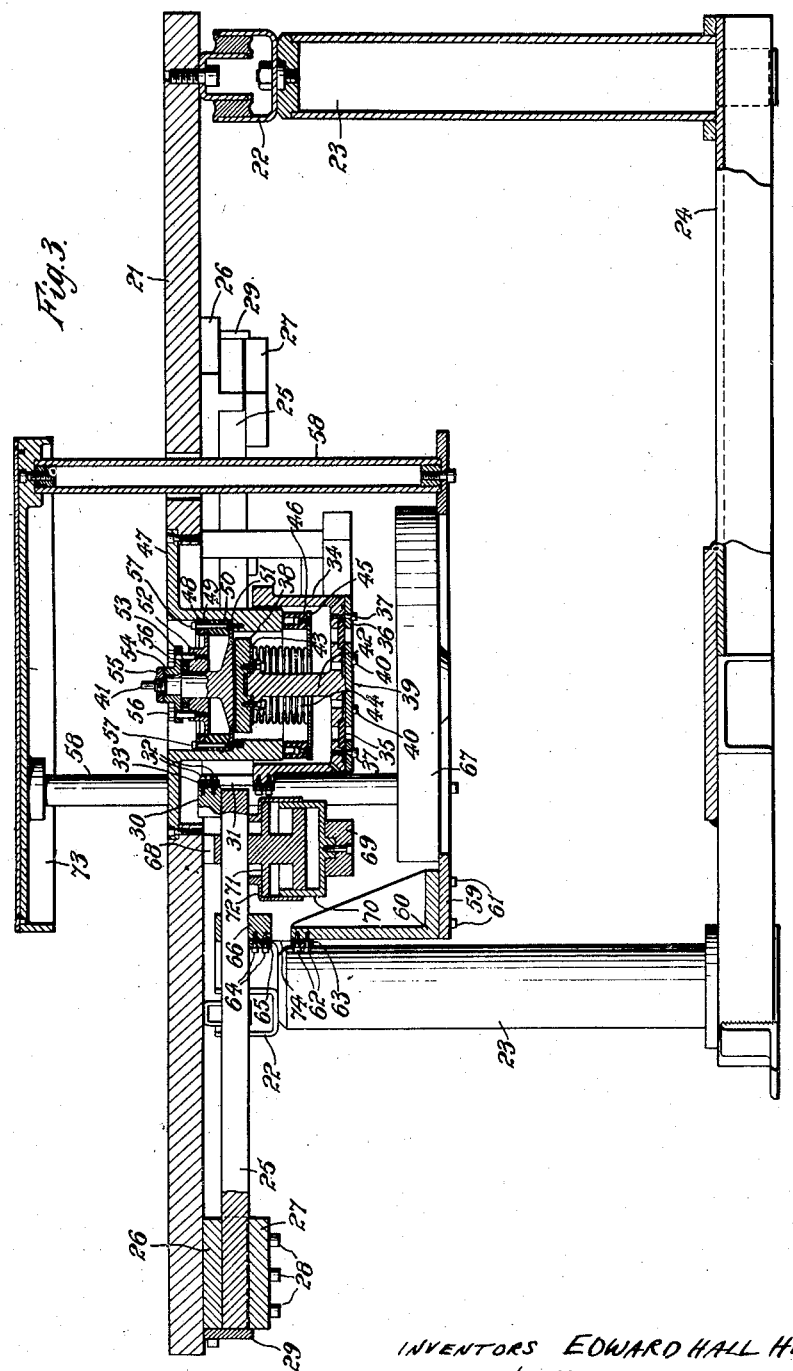
INVENTORS EDWARD HALL HIGHAM
& HORACE AUGUSTUS THOMAS
by
Campbell, Brumbaugh, Free & Graves July 22, 1958 E. H. HIGHAM ET AL 2,844,350
LIQUID WEIGHING AND DISPENSING DEVICE
Filed Jan. 24, 1952 3 Sheets-Sheet 3
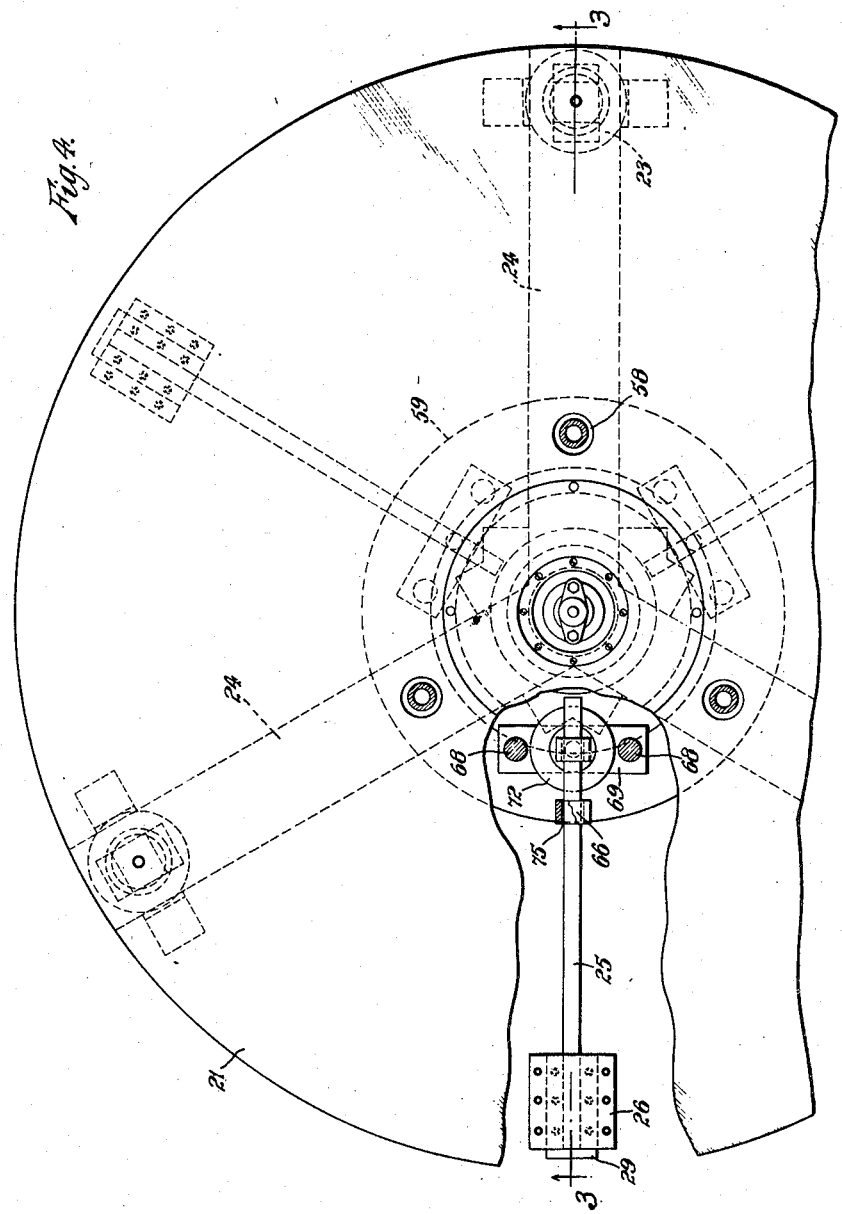
INVENTORS EDWARD HALL HIGHAM
& HORACE AUGUSTUS THOMAS
by
Campbell, Brumbaugh, Free & Graves

# United States Patent Office 2,844,350
Patented July 22, 1958

2,844,350

LIQUID WEIGHING AND DISPENSING DEVICE

Edward Hall Higham and Horace Augustus Thomas, Bebington, England, assignors to Lever Brothers Company, New York, N. Y., a corporation of Maine Application January 24, 1952, Serial No. 268,096

Claims priority, application Great Britain February 2, 1951

11 Claims. (Cl. 249—63)

This invention relate to apparatus for filling containers, and in particular to filling containers with a predetermined weight of material.

Many devices for filling containers with predetermined weights of material are known. For example, the containers to be filled are assumed to have a constant weight, or are weighed before filling, or their weight is balanced by means of an adjustable tare weight. The assumption of the tare weight of the container leads to errors where that weight is not constant. If the container has to be weighed before filling, or if its weight has to be balanced by means of an adjustable tare weight, the device is seldom fully automatic. Furthermore, these devices in order to be sufficiently sensitive are likely to have a long period and a low decrement.

It is an object of the present invention to provide an apparatus for filling containers with a predetermined weight of material which avoids some and greatly reduces others of the above mentioned disadvantages.

According to the present invention, there is provided an apparatus for filling containers with a predetermined weight of material, which apparatus comprises a member capable of being deformed by a load, a detecting element having an electrical parameter which is a function of the deformation, a measuring circuit responsive to said detecting element and capable of producing an electrical signal which is a function of said parameter, adjusting means responsive to said signal for adjusting at least one of the aforenamed components, namely the member, the detecting element, and the measuring circuit, standard weight moving means for loading said member with a standard weight and for removing the load due to the standard weight, a flow controller, and a control device responsive to said signal for actuating the flow controller.

For the purpose of this specification, the term "flow controller" is used to indicate any device which can be used to control the flow of material through a pipe or from a hopper, storage tank or similar device and includes such devices as valves, gates and screws; the term "measuring circuit" includes any circuit wherein a change of capacitance, inductance or resistance causes a change in current, voltage, frequency or phase. If the circuit is not a balanced circuit, it may, for example be tuned to resonance in order to register the deformation of the member.

Preferably the detecting element should be of the non-contact type so as not to constrain the deformation of the member. Such an element may consist of two parts, one being affixed to the member and the other fixed relative to the anchorage of the member, there being no direct mechanical connection between said two parts of the detecting element at that part of the member where the deformation takes place.

The non-contact type detecting element may consist of a capacitor of which one electrode is rigidly connected to the member, whereas the other electrode is fixed relative to the anchorage of the member so that a deflection of the member alters the distance between said electrodes and, hence, the capacitance of the capacitor. Alternatively, one of the parts may consist of an inductor, whereas the other part may consist of another inductor, or of a plate or of a shaped piece of ferro- or para-magnetic material so as to alter the mutual inductance, the self inductance, or the iron loss of said inductor or a combination of these factors, when the distance between the two parts comprising the detecting element is varied by a deflection of the member. A strain gauge or photoelectric devices may also be utilized. If the movable part of the non-contact type detecting element has to be electrically connected, the arrangement can be such that the lead, which may lie alongside the member up to the anchorage, or which may be in the form of metal bellows, simply alters the deformation characteristics without impairing the accuracy.

Where it is not desirable to use detecting elements of the non-contact type, micro switches may, for example, be used.

The member may be a strut or beam. The beam may be arranged to form a cantilever, that is to say, to have one end rigidly clamped or it may be a beam supported at both of its ends. In a preferred embodiment of the apparatus of the invention, the free ends of three horizontally arranged cantilevers are arranged to point towards the centre of a circle of which the axes of the cantilevers lie on equi-spaced radii, the load and deflection being shared by said cantilevers. A disk may be suspended from the free ends of the three cantilevers in such a manner that only vertical forces are transmitted. The container to be filled may be placed on the disk or on a platform attached to the cantilevers or to the disk. The deflection of the centre of the disk will equal the algebraic average of the deflection of the three cantilevers. In this embodiment, if a detecting element of the non-contact type is used, one part is fixed to the centre of the disk, whereas the other part is fixed relative to the anchorage of the cantilevers. This arrangement has the advantage that the system is independent of the position of the container on the weighing platform whereas, in a system using only one cantilever, if the weight of the container does not act in line with the standard weight, inaccuracies may result.

The apparatus according to the present invention may also be combined with devices which deliver an empty container to the weighing platform, detect its presence thereon, for example, by means of a photo-electric cell, set in motion the filling cycle, and remove the filled container from the weighing platform after filling.

A preferred embodiment of the invention will now be described with reference to the accompanying drawings in which:

Fig. 3 is a cross sectional elevation (on the line 3—3 of Fig. 4) of the mechanical construction of the apparatus.

Fig. 4 is a plan view (partly in section) of the mechanical construction of the apparatus with the weighing platform removed.

Figure 1:
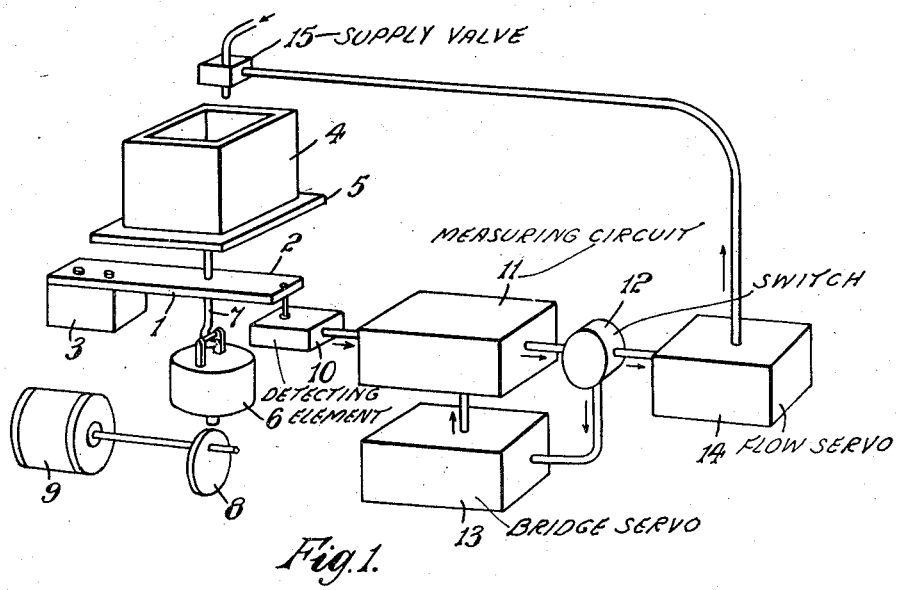
Fig. 1 is a diagrammatic block diagram.

With reference to Fig. 1, the member is in the form of a cantilever 1, consisting of a beam 2 fixed at one end by means of a clamp 3. An empty container 4 is placed on a weighing platform 5 which rests on the free end of the cantilever 1. A standard weight 6, which equals the predetermined weight of the material with which the container is to be filled, is capable of attachment to the cantilever by means of a hook 7. The load due to the standard weight 6 can be removed by lifting the standard weight off the hook by means of a cam 8 rotated by means of a motor 9.

The detecting element 10 consists of a capacitor of which one electrode is rigidly connected to the cantilever and the other electrode is fixed relative to the anchorage of the cantilever. The deflection of the cantilever will change the distance between the electrodes and, hence, the capacitance of the capacitor. The wire forming the connection to the electrode fixed to the cantilever runs along the beam up to the clamped part.

The capacitor is connected to the measuring circuit 11 which is in the form of a bridge. The out-of-balance signal of the bridge 11 is connected to the switch 12. By means of switch 12 the out-of-balance signal can be connected, in a manner described below, either to a servo system (hereinafter called the electrical bridge servo system 13) which is capable of balancing the bridge 11 by driving a variable capacitor which forms a balancing arm of the bridge, or to another servo system (hereinafter called the electrical flow controller servo system 14) which is capable of operating a flow controller in the form of a supply valve 15.

A preferred form of the mechanical construction of the apparatus is shown in Figs. 3 and 4. The apparatus is built around a massive circular bolster plate 21 which is supported near its periphery at three equi-spaced points by anti-vibration mounts 22 attached to vertical columns 23 which are fixed rigidly to the base 24. The height of these columns is fixed so that the level of the weighing platform 73 is convenient for the weighing operation.

Each of the three identical cantilevers 25 is clamped into a cut-out in a block of the same metal 26 by means of the plate 27 and six bolts 28, and this assembly is bolted to the bolster plate by six further bolts after accurate positioning of the cantilever arm, so that its free end is located at the correct distance from the centre of the bolster plate; its axis lies along a radius, and the effective length of all three cantilevers is the same. The plate 29 is used to facilitate these adjustments once the position of the block 26 has been determined.

A small block 30 (not shown in Fig. 4) is mounted on the upper face near the free end of each cantilever and is provided with a small range of adjustment along the axis of the cantilever.

A flexible suspension member 31 consisting of a length of 0.014 x ½" spring steel strip with short lengths of 1/32 x ½" brass strip sweated on either face at both ends, is clamped to this block by four screws 32 and a flat plate 33. These suspension members are set accurately at the correct distance from the encastered end of the cantilever and also from the point of application of the load.

The other end of the suspension member is similarly clamped to a "flat" machined on the rim of the summation unit. This unit is made up of a cylindrical pot 34 to which is clamped an insulation disk 35 by means of a metal plate 36 and a number of screws 37.

The detecting element is of the capacitor type and consists of a fixed electrode 41 and a movable electrode 38. The movable electrode is supported on the insulation piece 35 by a rigid brass column 42 which is clamped to the insulation piece 35 by means of a metal disk 39 and a plurality of screws 40. A circular plate 43 is clamped between the brass column and the electrode 38.

A flexible metallic bellows 44 is sweated to the plate 43 at one end and to a larger plate 45 at the other end; this latter plate is mounted on a ring of insulation material 46 which is attached rigidly but indirectly to the bolster plate 21. Thus the bellows 44 provides an electrical connection to the movable electrode 38 and modifies very slightly the deflection characteristics of the system. An electrical connection, not shown in the drawing, is made to the plate 45. The position of the electrodes of the detecting element is arranged so that with the cantilevers loaded only with the dead weight of the platform and its associated parts there is a gap of about .002 in. between the electrodes.

The fixing for the insulator supporting the plate 45 is provided by a brass cylinder with a large flange 47. The flange is machined to fit accurately into the central cut-out in the bolster plate and the inside is machined to accommodate the fixed electrode 41 and its associate mounting pieces.

A small range of adjustment for the fixed electrode 41 is provided by varying the setting of a calibrated spacer 53 which is clamped between a support plate 52 and a collar 54 by means of two screws 56. The electrode 41 itself is clamped to the collar 54 by a nut 55. The support plate 52 is clamped between two cylindrical insulators 49 and 50 by a metallic ring 48 and a number of screws 57 which also serve to fix a guard ring 51. The electrical connection to this electrode is taken from the turned portion which protrudes through the clamping nut 55.

The weighing platform 73 is supported on three columns 58 which, at their lower ends, are attached to a flat circular ring 59 at points equi-spaced on a convenient pitch circle diameter. Three brackets 60 (not shown in Fig. 4) are fixed by the screws 61 to this ring between the vertical columns, and suspension members 74, similar to those previously mentioned, are clamped to an upper surface of these brackets by the screws 62 and the flat plate 63.

The other ends of these suspension members are held by screws 64 and clamps 65, 66, which are accurately positioned along each cantilever so that each clamp applies its load at an equal distance from the encastered end. By this arrangement the deflection of each cantilever produced by the applied load is amplified mechanically by the same amount. The clamp 66 is secured to the cantilever by means of wedges 75 (Fig. 4).

The standard weight 67 rests on the ring 59 whilst the combined load is being measured, and is raised clear of this ring during the controlled filling process by a mechanism such as a cam or pneumatic device.

To reduce oscillations of the cantilevers, hydraulic dampers are attached between the points where the load is applied to the cantilever and the connection to the summation unit.

These dampers are attached to the bolster plate by two columns 68 and a cross piece 69 and they consist of a cylinder 70 containing a suitable fluid, a piston 71 fixed to the cantilever and having the appropriate clearance from the side of the cylinder, and a cover 72 to prevent ingress of unwanted matter. The piston 71 and cover 72 are secured to one another.

The following are typical dimensions of the embodiment described above. The cantilevers are made of steel having a Young's modulus of $3 \times 10^7$ lbs. per sq. in. The cantilevers have a length of 15 inches, width ¾" and thickness 1". With such a system a total load of 60 lbs. applied 10" from the encastered end of one cantilever will produce a deflection at the point of application of the load of $10.68 \times 10^{-3}$ inches which is increased by mechanical amplification to $19.7 \times 10^{-3}$ inches at the free end of the cantilever. When this load is applied by means of a platform fixed to each cantilever at a distance of 10" from their encastered ends, the net deflection of the detector element is a third of this value, namely $6.56 \times 10^{-3}$ inches and this deflection is obtained wherever the load of 60 lbs. be distributed on the platform.

It will be noted that when a container is placed on the weighing platform 73, this weight is transmitted by means of the three columns 58 to the flat circular ring 59. The downward pressure on the ring 59 is transmitted by the three brackets 60, suspension members 74 and clamps 66 to the three cantilevers 25 causing a downward deflection of these three cantilevers. The movable electrode 38 which is connected by the rigid brass column 42, cylindrical pot 34, the suspension members 31 and block 30 to the cantilevers, follows the movement of the cantilevers. Thus by placing a load on the weighing platform (or on the circular ring 59) a downward deflection of the cantilevers and a consequent increase of the distance between the upper fixed electrode 41 and the lower movable electrode 38 is produced.

The procedure of operation will now be described with reference to Fig. 1.

An empty container 4 is placed on the weighing platform 5. Its presence thereon is detected by means of a container position detector (not shown) which causes the motor 9 to be energised so as to rotate the cam 8 to that position where the standard weight is no longer supported by the cam but rests on the hook 7 thus loading the cantilever, and which also causes the switch 12 to connect the bridge output to the electrical bridge servo system 13. The output of the bridge (that is its out-of-balance signal) applied to the electrical bridge servo system 13 causes it to drive the variable balance capacitor until the out-of-balance signal disappears, that is until the bridge is in balance. When the bridge is balanced, it has registered the deflection of the cantilever due to the combined weight of the empty container and the standard weight. Thus the predetermined value of the signal is zero.

The switch 12 now transfers the bridge output from the electrical bridge servo system 13 to the electrical flow controller servo system 14 and causes the load due to the standard weight 6 to be removed by energising the motor 9, which rotates the cam 8, which lifts the standard weight off the hook 7. The removal of the load due to the standard weight causes a change in the deflection of the cantilever. In consequence the bridge becomes unbalanced and causes the electrical flow controller servo system 14 to open the supply valve 15 which admits the substance to be filled into the container. As the bridge returns towards the balance condition the electrical flow controller servo system 14 starts to close the supply valve 15 and continues to do so at a rate which is a function of the magnitude of the out-of-balance signal, so that the supply valve will be completely closed when the bridge balance is restored, that is when the signal is zero.

Figure 2:
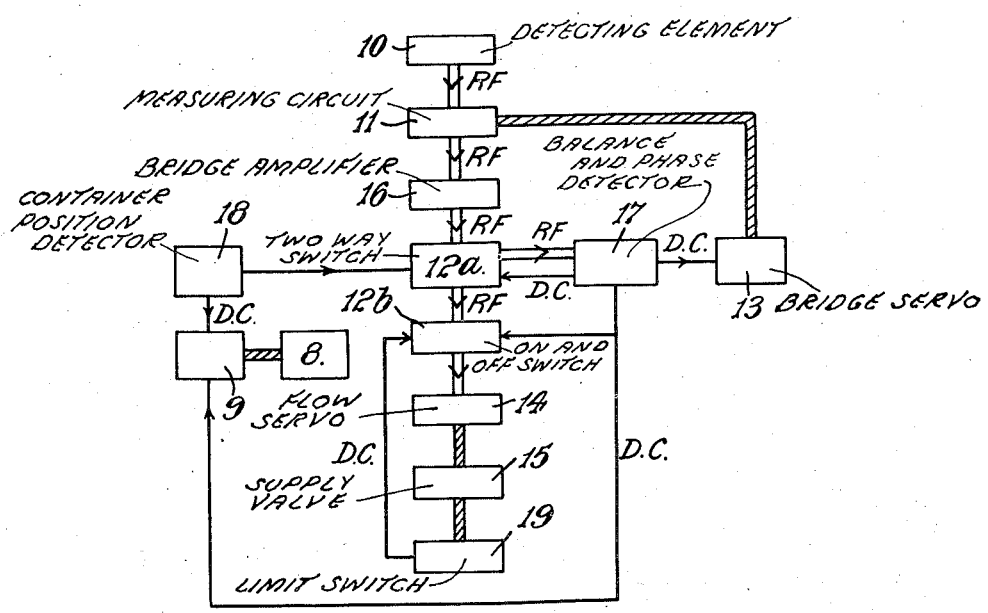
Fig. 2 is a functional block diagram showing more particularly the electrical interconnections.

The interconnection of the various parts and the means for obtaining the proper sequence of operation, will now be described in greater detail with reference to Fig. 2.

For simplicity of description, the switching signal will be referred to as "D. C.," and the signal which is a function of the capacitance of the detecting element as "R. F."

The detecting element 10 is connected to the bridge 11 by means of an R. F. path. The R. F. bridge output is passed to the input of the bridge amplifier 16 and the amplified R. F. output to the gate 12a. The gates 12a and 12b are a two-way and an on-off electronic switch respectively, the operations of which are controlled by D. C. signals. The amplified R. F. bridge output may be passed by means of the gate 12a to the balance indicator 17, and from there to the bridge servo 13. Alternatively, the amplified bridge output may be passed by means of the gate 12a to the gate 12b, and from there to the electrical flow controller servo system 14.

The balance and phase detector 17 generates a D. C. signal, the magnitude and polarity of which varies according to the amplitude and phase of the R. F. input, and a further D. C. signal when the R. F. input is reduced to zero. The said D. C. signals control the electrical bridge servo system 13, the motor 9, and the gates 12a and 12b. The container position detector 18, which may consist of a photo-electric cell, controls the motor 9 and the gate 12a. A limit switch 19 is provided which is mechanically coupled to the supply valve 15. When the supply valve 15 is closed, the limit switch is operated thereby producing a D. C. signal to close the gate 12b.

The presence of a container 4 on the weighing platform 5 is detected by the container position detector 18. Thereupon the container position detector sends a D. C. signal to the gate 12a, which causes it to pass the R. F. signal from the bridge amplifier 16 to the balance indicator 17, and also causes the motor 9 to be energised so that the cantilever 1 becomes loaded by the standard weight 6 after the cam 8 has been rotated by this motor. The out-of-balance R. F. signal of the bridge 11 passes via the bridge amplifier 16 and gate 12a to the balance and phase detector 17 which in turn energises the electrical bridge servo system 13. The electrical bridge servo system 13 then drives a variable balance capacitor in the bridge circuit 11 until the bridge is balanced, thereby registering the deflection of the cantilever due to the combined load of the empty container and the standard weight. When the out-of-balance R. F. signal is zero, the balance and phase detector 17 will, by means of a D. C. signal to the gate 12a, switch the R. F. signal to the gate 12b, open gate 12b, and cause the motor 9 to rotate the cam 8 thereby removing the load due to the standard weight 6 from the cantilever 1. Due to the removal of this load the deflection of the cantiliver will be altered thereby unbalancing the bridge 11. The out-of-balance R. F. signal will pass via the bridge amplifier 16, gate 12a and gate 12b to the electrical flow controller servo system 14. The electrical flow controller servo system 14, on receiving an R. F. input signal, will open the supply valve 15, thereby permitting the flow of material into the container 4. As more of the material is admitted to the container, the deflection of the cantilever 1 will return towards the registered value. As it approaches this, the magnitude of the out-of-balance signal from the R. F. bridge will decrease and this in turn will cause the electrical flow controller servo system 14 to close the supply valve 15 so that it will eventually close completely when balance is restored. When the supply valve 15 is fully closed, the limit switch 19 operates to close the gate 12b; this cannot be reopened until the R. F. bridge has been re-balanced with a new container and the standard weight in position to load the cantilever.

When a new container is placed on the weighing platform the while sequence is repeated.

We claim:

1. Apparatus for filling containers with a predetermined weight of material, which apparatus comprises in combination a member capable of being deformed by a load, a detecting element having an electrical parameter which is a function of the deformation, a measuring circuit responsive to said detecting element and capable of producing an electrical signal which is a function of said parameter, adjusting means responsive to said signal for adjusting at least one of the aforenamed components, namely the member, the detecting element, and the measuring circuit, by an amount which is a function of the deformation standard weight moving means for loading said member with a standard weight before measurement of the deformation and for removing the load due to the standard weight after measurement of the deformation, a flow controller, and a control device responsive to said signal for actuating the flow controller to introduce a preestablished weight of material into the container which is a function of the deformation by the standard weight.

2. Apparatus as claimed in claim 1 in which the measuring circuit is the adjustable component.

3. Apparatus for filling containers with a predetermined weight of material, which apparatus comprises in combination a member capable of being deformed by a load, a detecting element of the non-contact type having an electrical parameter which is a function of the deformation, a measuring circuit responsive to said detecting element and capable of producing an electrical signal which is a function of said parameter, adjusting means responsive to said signal for adjusting the measuring circuit by an amount which is a function of the deformation, standard weight moving means for loading said member with a standard weight before measurement of the deformation and for removing the load due to the standard weight after measurement of the deformation, a flow controller, and a control device responsive to said signal for actuating the flow controller to introduce a preestablished weight of material into the container which is a function of the deformation by the standard weight.

4. Apparatus as claimed in claim 3 in which the detecting element is a capacitor having one electrode connected to the member and the other electrode fixed relative to the anchorage of the member.

5. Apparatus for filling containers with a predetermined weight of material, which apparatus comprises in combination a member capable of being deformed by a load, a detecting element having an electrical parameter which is a function of the deformation, an electrical bridge circuit responsive to said detecting element and capable of producing an out-of-balance signal which is a function of said parameter, adjusting means responsive to said signal for adjusting the bridge, standard weight moving means for loading said member with a standard weight and for removing the load due to the standard weight, a flow controller, and a control device responsive to said signal for actuating the flow controller.

6. Apparatus for filling containers with a predetermined weight of material which apparatus comprises in combination a member capable of being deformed by a load, a detecting element of the capacitor type having one electrode connected to the member and the other electrode fixed relative to the anchorage of the member, an electrical bridge circuit responsive to said detecting element and capable of producing a radio frequency out-of-balance signal which is a function of said parameter, adjusting means responsive to said signal for adjusting the bridge, a standard weight moving means for loading said member with a standard weight and for removing the load due to the standard weight, a flow controller, and a control device responsive to said signal for actuating the flow controller.

7. Apparatus as claimed in claim 6 in which the adjusting means comprises an electrical bridge servo system responsive to said bridge radio frequency out-of-balance signal and in which the control device comprises an electrical flow controller servo system responsive to said bridge radio frequency out-of-balance signal.

8. Apparatus for filling containers with a predetermined weight of material which apparatus comprises in combination a member capable of being deformed by a load, a detecting element of the capacitor type having one electrode connected to the member and the other electrode fixed relative to the anchorage of the member, an electrical bridge circuit responsive to said detecting element and capable of producing a radio frequency out-of-balance signal which is a function of said parameter, a bridge amplifier for amplifying said radio frequency out-of-balance signal, a first gate, a second gate, a balance indicator, an electrical bridge servo system for adjusting said bridge, standard weight moving means for loading said member with a standard weight and for removing the load due to the standard weight, a flow controller, and an electrical flow controller servo system for actuating the flow controller, the said first gate being capable of passing said radio frequency signal to the second gate or to the balance indicator, said balance indicator being capable of producing a direct current signal the magnitude and polarity of which are a function of the amplitude and phase of the radio frequency input, which direct current signal is capable of being passed to the electrical bridge servo system, and a further direct current signal when the radio frequency input is reduced to zero, said further direct current signal being capable of switching the radio frequency output of the first gate from the balance indicator to the second gate and the radio frequency output of the second gate to the electrical flow controller servo system.

9. Apparatus for filling containers with a predetermined weight of material, which apparatus comprises in combination a cantilever member capable of being deformed by a load, a detecting element having an electrical parameter which is a function of the deformation, a measuring circuit responsive to said detecting element and capable of producing an electrical signal which is a function of said parameter, adjusting means responsive to said signal for adjusting at least one of the aforenamed components, namely the member, the detecting element, and the measuring circuit by an amount which is a function of the deformation, standard weight moving means for loading said member with a standard weight before measurement of the deformation and for removing the load due to the standard weight after measurement of the deformation, a flow controller, and a control device responsive to said signal for actuating the flow controller.

10. Apparatus for filling containers with a predetermined weight of material, which apparatus comprises in combination a member in the form of three horizontal cantilevers arranged to point towards the centre of a circle the axes of said cantilevers lying on equispaced radii of said circle, said cantilevers being capable of deformation by a load, a detecting element having an electrical parameter which is a function of the deformation, a measuring circuit responsive to said detecting element and capable of producing an electrical signal which is a function of said parameter, adjusting means responsive to said signal for adjusting at least one of the aforenamed components, namely the member, the detecting element, and the measuring circuit by an amount which is a function of the deformation, standard weight moving means for loading said member with the standard weight before measurement of the deformation and for removing the load due to the standard weight after measurement of the deformation, a flow controller, and a control device responsive to said signal for actuating the flow controller.

11. Apparatus for filling containers with a predetermined weight of material, which apparatus comprises in combination a member in the form of three horizontal cantilevers arranged to point towards the centre of a circle the axes of said cantilevers lying on equispaced radii of said circle, said cantilevers being capable of deformation by a load, a detecting element of the capacitor type having one electrode connected to the cantilevers near their free ends and the other electrode fixed relative to the anchorage of the member, an electrical bridge circuit responsive to said detecting element and capable of producing a radio frequency out-of-balance signal which is a function of said parameter, a bridge amplifier for amplifying said radio frequency out-of-balance signal, a first gate, a second gate, a balance indicator, an electrical bridge servo system for adjusting said bridge, standard weight moving means for loading said member with a standard weight and for removing the load due to the standard weight, a flow controller, and an electrical flow controller servo system for actuating the flow controller, the said first gate being capable of passing said radio frequency signal to the second gate or to the balance indicator, said balance indicator being capable of producing a direct current signal the magnitude and polarity of which are a function of the amplitude and phase of the radio frequency input, which direct current signal is capable of being passed to the electrical bridge servo system, and a further direct current signal when the radio frequency input is reduced to zero, said further direct current signal being capable of switching the radio frequency output of the first gate from the balance indicator to the second gate and the radio frequency output of the second gate to the electrical flow controller servo system.

(References on following page)

References Cited in the file of this patent

UNITED STATES PATENTS

| | | | |
|---|---|---|---|
| 2,323,023 | Flanagan | June 29, | 1943 |
| 2,371,040 | Fisher | Mar. 6, | 1945 |
| 2,381,086 | Steele | Aug. 7, | 1945 |
| 2,581,204 | Reilly | Jan. 1, | 1952 |
| 2,581,205 | Reilly | Jan. 1, | 1952 |
| 2,597,751 | Ruge | May 20, | 1952 |
| 2,598,812 | Marco | June 3, | 1952 |